United States Patent
Noé et al.

(10) Patent No.: US 10,108,503 B2
(45) Date of Patent: Oct. 23, 2018

(54) METHODS AND SYSTEMS FOR UPDATING A RECOVERY SEQUENCE MAP

(71) Applicant: HGST Netherlands B.V., Amsterdam (NL)

(72) Inventors: Daniel Peter Noé, Littleton, MA (US); Pulkit Ambikanandan Misra, Durham, NC (US)

(73) Assignee: Western Digital Technologies, Inc., San Jose, CA (US)

(*) Notice: Subject to any disclaimer, the term of this patent is extended or adjusted under 35 U.S.C. 154(b) by 124 days.

(21) Appl. No.: 14/833,844

(22) Filed: Aug. 24, 2015

(65) Prior Publication Data

US 2017/0060698 A1 Mar. 2, 2017

(51) Int. Cl.
*G06F 11/14* (2006.01)
*G06F 12/02* (2006.01)
(Continued)

(52) U.S. Cl.
CPC ...... *G06F 11/1469* (2013.01); *G06F 12/0246* (2013.01); *G06F 13/4022* (2013.01); *G06F 13/4282* (2013.01); *G06F 11/1446* (2013.01); *G06F 11/1448* (2013.01); *G06F 11/1458* (2013.01); *G06F 2201/84* (2013.01);
(Continued)

(58) Field of Classification Search
CPC ............ G06F 2212/69; G06F 2212/72; G06F 2212/7204; G06F 2212/7207; G06F 2212/7209; G06F 2212/7211; G06F 2212/1032; G06F 2212/1036; G06F 3/0679; G06F 12/0246; G06F 11/1469; G06F 11/1446; G06F 11/1458; G06F 11/1448
See application file for complete search history.

(56) References Cited

U.S. PATENT DOCUMENTS 6,000,006 A * 12/1999 Bruce ................. G06F 11/1068
711/103
7,047,355 B2 5/2006 Nakatani et al.
(Continued)

FOREIGN PATENT DOCUMENTS

WO WO-2009/140000 A1 11/2009

OTHER PUBLICATIONS

Bihani, Jagadish, "Flash File Systems and Deduplication during Garbage Collection," Project Report for Master of Technology, Department of Computer Science and Engineering, Indian Institute of Technology, Bombay, Mumbai, 29 pages (Oct. 2010).
(Continued)

*Primary Examiner* — Joseph O Schell
(74) *Attorney, Agent, or Firm* — Morgan, Lewis & Bockius LLP

(57) ABSTRACT

Techniques for improving storage journaling are disclosed. In some embodiments, the techniques may be realized as a method for improving storage journaling including recording to a journal a count of valid blocks in a first chunk of storage in flash memory, receiving a request to write a second chunk to the flash memory, determining, using a controller, whether the count of valid blocks in the first chunk is less than a specified threshold, and in the event the number of valid blocks in the first chunk is less than the specified threshold, writing the second chunk to a location of the first chunk of storage in the flash memory.

21 Claims, 5 Drawing Sheets

(51) Int. Cl.
*G06F 13/40* (2006.01)
*G06F 13/42* (2006.01)

(52) U.S. Cl.
CPC ............... *G06F 2212/1032* (2013.01); *G06F 2212/7201* (2013.01); *G06F 2212/7208* (2013.01); *G06F 2212/7209* (2013.01)

(56) References Cited

U.S. PATENT DOCUMENTS

| | | | |
|---|---|---|---|
| 7,167,880 B2 | 1/2007 | Amano et al. | |
| 7,680,983 B2 | 3/2010 | Sutoh et al. | |
| 8,631,209 B2 | 1/2014 | Serlet et al. | |
| 8,838,893 B1 | 9/2014 | Randall et al. | |
| 2005/0138271 A1 | 6/2005 | Bernstein et al. | |
| 2007/0174578 A1* | 7/2007 | Oshima | G06F 12/0246 711/170 |
| 2008/0281876 A1* | 11/2008 | Mimatsu | G06F 11/1469 |
| 2011/0060864 A1* | 3/2011 | Yoshii | G06F 3/061 711/103 |
| 2012/0072683 A1* | 3/2012 | Iliadis | G06F 12/0246 711/159 |
| 2012/0191900 A1* | 7/2012 | Kunimatsu | G06F 3/0679 711/103 |
| 2013/0275650 A1* | 10/2013 | Hida | G06F 12/0246 711/102 |
| 2014/0082261 A1* | 3/2014 | Cohen | G11C 16/06 711/103 |
| 2014/0188824 A1 | 7/2014 | Amit et al. | |
| 2014/0325117 A1* | 10/2014 | Canepa | G06F 12/0246 711/103 |
| 2014/0372710 A1* | 12/2014 | Bisht | G06F 12/1027 711/143 |
| 2015/0046670 A1 | 2/2015 | Kim et al. | |
| 2015/0095546 A1* | 4/2015 | Bennett | G06F 12/0246 711/5 |

OTHER PUBLICATIONS

Mammarella, M. et al., "Modular Data Storage with Anvil," Proceedings of the ACM SIGOPS 22nd Symposium on Operating Systems Principles, 17 pages (2009).

Oracle, "Chapter 13: Implementing Storage and Backing Maps," Oracle Coherence Developer's Guide, Release 3.7.1, Part No. E22837-01, retrieved online for URL: <http://docs.oracle.com/cd/E24290_01/coh.371/e22837/cache_back.htm>, 15 pages (retrieved on Oct. 15, 2014).

Prakash, R. and Singh, S., "Improving RAID Performance and Reliability with Non-volatile Write Journals," Cypress Perform, retrieved online from URL: <http://www.cypress.com/?docID=21350>, pp. 1-5 (Mar. 2010).

Korean Office Action from Korean Patent Application No. 10-2016-0107942, dated Jun. 20, 2017.

UK Search Report dated Feb. 13, 2017, which issued in Application No. GB1614434.7.

Japanese Office Action from Japanese Patent Application No. 2016-164095, dated Oct. 31, 2017, 12 pages.

* cited by examiner

METHODS AND SYSTEMS FOR UPDATING A RECOVERY SEQUENCE MAP

BACKGROUND

Journaling file systems may track changes prior to commitment of the changes to the file system. Such journaling may reduce risk of data corruption or loss in the event of a system crash or error. Journals typically are a limited size. Journals can write from a beginning of a space (e.g., a file) to an end of the space and wrap around to the beginning of the space once the end is reached. Existing journaled data layouts suffer from the problem where useful data must be overwritten when the journal wraps around and arrives at the point where there is existing data. The remaining useful data must be discarded or rewritten into the new location, which causes "write amplification" and reduces performance (because writes typically are slower than reads).

SUMMARY

Techniques for improving storage journaling are disclosed. In some embodiments, the techniques may be realized as a method for improving storage journaling including recording to a journal a count of valid blocks in a first chunk of storage in flash memory, receiving a request to write a second chunk to the flash memory, determining, using a controller, whether the count of valid blocks in the first chunk is less than a specified threshold, and in the event the number of valid blocks in the first chunk is less than the specified threshold, writing the second chunk to a location of the first chunk of storage in the flash memory.

Embodiments include storing data in a journal providing the ability to 'play back' the journal and recover the correct state of data at all times without requiring the journal to be played back sequentially. Embodiments may include the ability to skip over some parts of the journal during normal (writing) operation. As discussed in further detail below, the journal may provide the ability to do recovery (play back) of the journal even when it contains older data that has been skipped. The journal may further provide the ability to do recovery in parallel using many CPU cores.

In accordance with aspects of the disclosure, a method for improving storage journaling can comprise the steps of recording to a journal a count of valid blocks in a first chunk of storage in flash memory, receiving a request to write a second chunk to the flash memory, and determining, using a controller, whether the count of valid blocks in the first chunk is below a specified threshold. The method can also include the steps of writing the second chunk to a location of the first chunk of storage in the flash memory, in the event the number of valid blocks in the first chunk is below the specified threshold, receiving a recovery request, and recovering one or more portions of the flash memory using a recovery sequence map.

In accordance with additional aspects of this embodiment, the count of valid blocks can be maintained in metadata associated with one or more chunks of storage in the flash memory, and the metadata can be stored associated with a logical block address map.

In accordance with additional aspects of this embodiment, the count is updated when an overwrite of one or more blocks in the first chunk occurs.

In accordance with additional aspects of this embodiment, writing the second chunk to a location of the first chunk of storage in the flash memory can comprise repacking a portion of data of the first chunk of storage and writing the portion of data to a second storage location in the flash memory.

In accordance with additional aspects of this embodiment, in the event the number of valid blocks in the first chunk exceeds the specified threshold, the method can determine, using the controller, whether a count of valid blocks in a third chunk of storage in the flash memory is less than the specified threshold.

In accordance with additional aspects of this embodiment, chunks of storage of flash memory can be evaluated in a sequential order to determine whether a particular chunk of storage of flash memory contains a number of valid blocks meeting a specified threshold.

In accordance with additional aspects of this embodiment, metadata associated with one or more chunks of storage can contain a count of valid blocks in each of the one or more chunks of storage and is sorted to identify a block of storage having a lowest count of valid blocks.

In accordance with additional aspects of this embodiment, the threshold can be specified to reduce write amplification problems.

In accordance with additional aspects of this embodiment, the threshold can be adjusted depending on at least one of: a level of CPU utilization, a level of network utilization, and a user specified preference.

In accordance with additional aspects of this embodiment, the threshold requires less than fifty percent of the blocks to be valid blocks to use the location of a chunk as a write location for the second chunk.

In accordance with additional aspects of this embodiment, the method can also comprise the step of associating a logical block address with a flash memory block sequence number.

In accordance with additional aspects of this embodiment, associating the logical block address with the flash memory block sequence number can comprise associating the flash memory block sequence number with the logical block address in a logical block address map.

In accordance with additional aspects of this embodiment, recovering one or more portions of the flash memory can comprise the steps of reading a chunk of the flash memory prior to recovery, determining whether a physical block of the chunk read from flash memory is in a recovery sequence map, in the event the physical block is not in the recovery sequence map, adding an address of the physical block to the logical block address map, and adding a sequence number associated with the chunk to the recovery sequence map.

In accordance with additional aspects of this embodiment, recovering one or more portions of the flash memory comprises can comprise the steps of reading a chunk of the flash memory prior to recovery, determining whether a physical block of the chunk read from flash memory is in a recovery sequence map, in the event the physical block is in the recovery sequence map, comparing a sequence number associated with the read chunk to a sequence number associated with the chunk in the recovery sequence map, in the event the sequence number associated with the read chunk is higher than the sequence number associated with the chunk in the recovery sequence map, updating the logical block address map to include a physical block address of the physical block, and updating the recovery sequence map to contain the sequence number associated with the read chunk.

In accordance with additional aspects of this embodiment, the method can comprise ignoring the read block wherein the sequence number associated with the read chunk is lower than the sequence number associated with the chunk in the recovery sequence map.

In accordance with additional aspects of this embodiment, the method can further comprise the steps of partitioning the logical block address map by logical block address, partitioning a recovery sequence map by logical block address, and providing a lock for locking a range of block addresses, wherein the lock facilitates concurrent recovery of flash memory storage.

In accordance with aspects of the disclosure, a computer program product comprised of a series of instructions executable on a computer, the computer program product performing a process for improving storage journaling, the computer program implementing the steps of recording to a journal a count of valid blocks in a first chunk of storage in flash memory, receiving a request to write a second chunk to the flash memory, determining, using a controller, whether the count of valid blocks in the first chunk is less than a specified threshold, in the event the number of valid blocks in the first chunk is less than the specified threshold, writing the second chunk to a location of the first chunk of storage in the flash memory, receiving a recovery request, and recovering one or more portions of the flash memory using a recovery sequence map.

In accordance with aspects of the disclosure, a system for improving storage journaling can comprise a storage media device and a PCIe-based device controller associated with the storage media device, wherein the PCIe-based device controller is configured to record to a journal a count of valid blocks in a first chunk of storage in flash memory, receive a request to write a second chunk to the flash memory, determining whether the count of valid blocks in the first chunk is less than a specified threshold, in the event the number of valid blocks in the first chunk is less than the specified threshold, write the second chunk to a location of the first chunk of storage in the flash memory, receive a recovery request, and recovering one or more portions of the flash memory using a recovery sequence map.

In accordance with additional aspects of this embodiment, in the event the number of valid blocks in the first chunk exceeds the specified threshold the device controller can determine whether a count of valid blocks in a third chunk of storage in the flash memory is less than the specified threshold.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure relates to techniques for improving storage journaling for solid state drives ("SSDs") (e.g., comprising flash memory). Random Access friendly Solid State storage, data structures, algorithms, and/or circuitry (e.g., (micro)processor, logic gates, switches, an application specific integrated circuit (ASIC), a programmable logic controller (e.g., FPGA), and an embedded microcontroller) may be provided that allow improved storage journaling.

Figure 1:
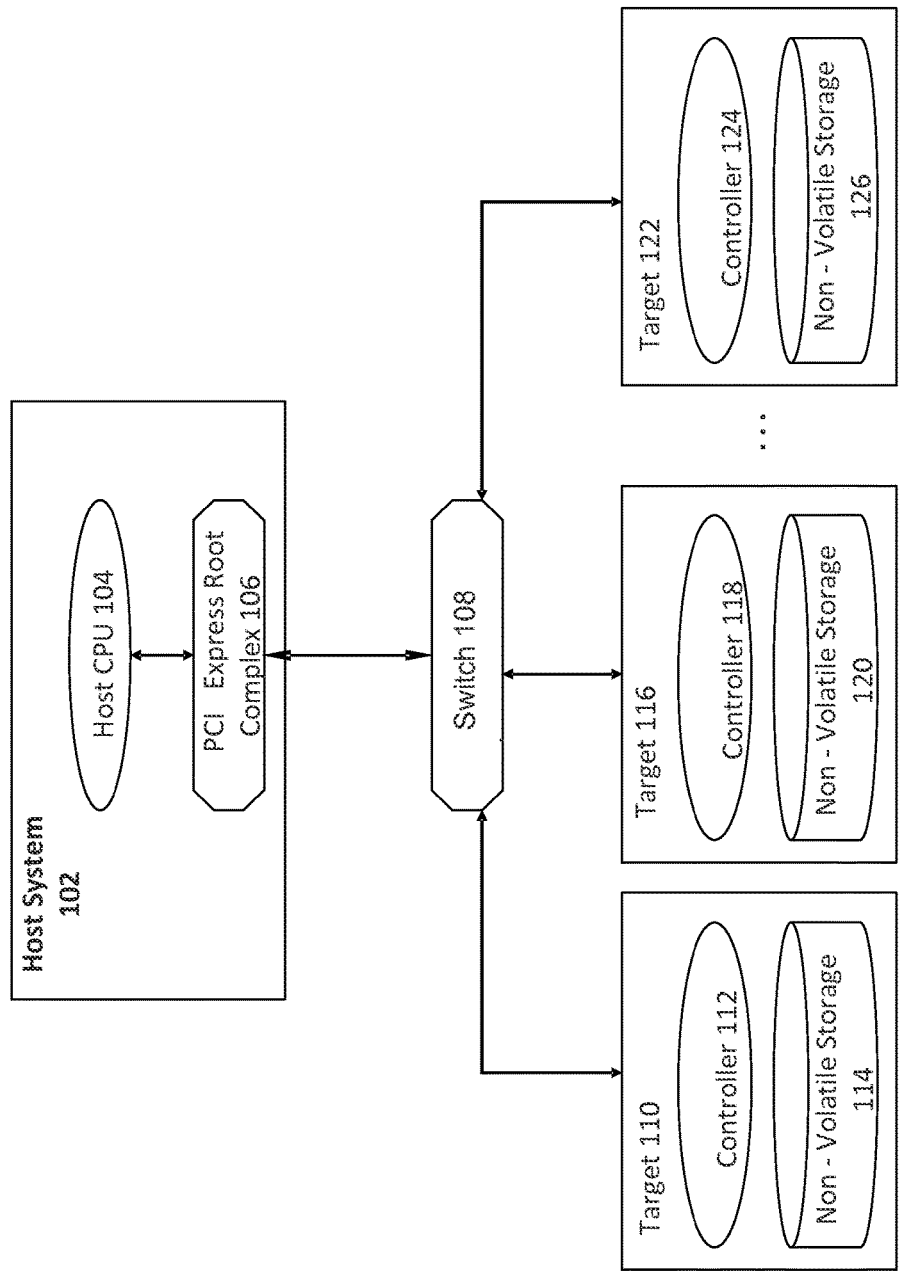
FIG. 1 is a block diagram depicting a plurality of PCIe devices in communication with a host device, in accordance with an embodiment of the present disclosure.

Turning now to the drawings, FIG. 1 is a block diagram depicting a PCIe device in communication with a host device, in accordance with an embodiment of the present disclosure. FIG. 1 includes a number of computing technologies such as a host system 102, host CPU 104, and PCI express root complex 106. Switch 108 may communicatively couple a plurality of targets (e.g., PCIe devices, such as NVMe based targets) such as Targets 110, 116 and 122 to host system 102 via PCI express root complex 106.

Target 110 may contain controller 112 (e.g., NVMe controller) and non-volatile storage 114. Target 116 may contain controller 118 (e.g., NVMe controller) and non-volatile storage 120. Target 122 may contain controller 124 (e.g., NVMe controller) and non-volatile storage 126.

Memory based resources may be accessible to Host System 102 via a memory interface (e.g., double data rate type three synchronous dynamic random access memory (DDR3 SDRAM)). Memory can take any suitable form, such as, but not limited to, a solid-state memory (e.g., flash memory, or solid state device (SSD)), optical memory, and magnetic memory.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller (e.g., FPGA), and an embedded microcontroller, for example.

Figure 2:
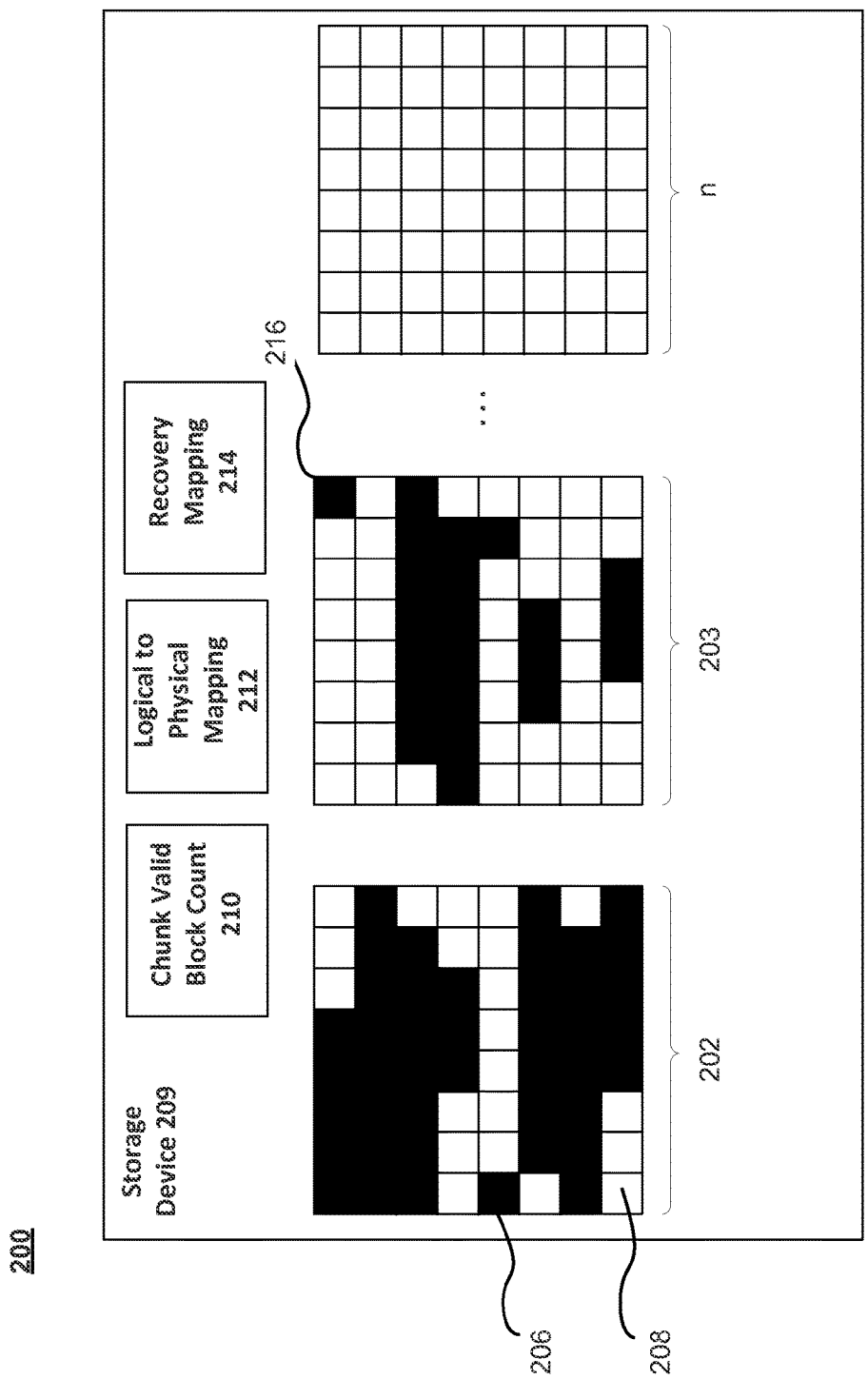
FIG. 2 is a block diagram depicting data structures for improved storage journaling, in accordance with an embodiment of the present disclosure.

FIG. 2 is a block diagram depicting data structures for improved storage journaling, in accordance with an embodiment of the present disclosure. FIG. 2 includes storage device 209 having chunk 202, chunk 203 through chunk n, chunk valid block count 210, logical to physical mapping 212, and recovery mapping 214. In some embodiments, two or more of chunk valid block count 210, logical to physical mapping 212, and recovery mapping 214 may be combined.

Data may be written out (e.g., sequentially) in "chunks" which may contain the data and metadata for a number of individual "blocks". If a block is overwritten later it may not be updated in place. Instead, the updated data block may be written into a new chunk. Chunks may typically be written out sequentially until reaching the end of a storage device. Typically journaled data layouts upon reaching the end of storage in a storage device, "wrap around" chunk writes to the beginning of the device. At this point new chunk writes typically overwrite existing chunks and the valid data within these chunks may first be repacked into a new chunk or discarded.

Embodiments of the disclosure may provide a data layout capable of tolerating an unclean shutdown or crash at any time. To handle an unclean shutdown or crash, embodiments may use a journaled layout. Although illustrated with two chunks, a storage device may include any number of portions of storage (e.g., up to chunk n). Although chunks 202 and 203 are depicted as chunks of a particular size, other sizes and portions or types of storage may be used (e.g., tracks, sectors, chunks of different sizes, etc.) As illustrated in FIG. 2, chunks 202 and 203 may include 64 blocks of storage some used by valid data (dark blocks including for example blocks 206 and 216) and some either unused or holding data which has been overwritten (light blocks including for example block 208). Chunks 202 and 203 may be two chunks in a storage journaling system and they each may be associated with a sequence number (i.e., 202 and 203, respectively). In some embodiments, chunk 202 may be a chunk that a journal system is currently writing to, and chunk 203 may be a next sequential chunk.

According to some embodiments, a number of currently valid blocks in each chunk may be stored in chunk valid block count 210 (e.g., 43 valid blocks in chunk sequence number 202 and 22 valid blocks in chunk sequence number 203). In other embodiments, a data structure may track a number of valid portions of data in tracks, sectors, or other portions of storage. Chunk valid block count 210 may associate a sequence number of a chunk with a count of valid blocks (e.g., blocks containing data not deleted or overwritten). If a write request is received, a process or circuitry handling the write request (e.g., a storage controller of storage device 209) may determine whether to write to a current chunk based on one or more factors. For example, a determination of whether to use a current chunk may be made based on whether a number of valid blocks in a current chunk is less than a specified threshold. If, for example, a threshold is 50% and the current chunk is chunk sequence number 202, a number of valid blocks may be identified using the sequence number to map to a count in chunk valid block count 210. In the present example, 43 blocks out of 64 blocks of chunk sequence number 202 may be valid (~67%).

An evaluation of chunk sequence number 203 may determine that only 22 blocks out of 64 blocks are valid (~34%), thus chunk sequence 202 may be "skipped" and the data of the write request may be written to chunk sequence number 203.

Writing data to chunk sequence number 203 and skipping chunk sequence number 202 may break from a traditional sequential journal model and may require additional data to ensure recoverability. Recovery mapping 214 may track a sequence number associated with a valid portion of data (e.g., a physical chunk containing a most current block of data). Traditionally, recovery may read chunks sequentially and use a chunk having a block of physical storage associated with a logical block address until a new chunk with a higher sequence number having a physical block associated with the same logical block address is identified. At that point the new physical block address may be associated with the logical block address. Recovery mapping 214 may associate a sequence number or other indicator of a portion of storage with a logical block address so that a recovery process may identify a current version of a portion of storage. For example, Recovery mapping 214 may associate a sequence number of a chunk with a logical block address. In some embodiments, when a recovery request is received one or more portions of storage may be read sequentially. Recovery mapping 214 may be generated as storage is read to associate a sequence number of a chunk having a physical block with a current copy of data with a logical block address.

In some embodiments, recovery mapping 214 may provide locking which may be on a per logical block basis, on a range of logical blocks, or on another unit of storage. Generation of a recovery sequence map may indicate a sequence number of a chunk associated with the physical block having the current data for a logical block, recovery may not require all writes to be read from a journal and applied sequentially. Chunks may be read in parallel and recovered. Recovery mapping 214 may partition a recovery sequence map and/or a logical block address map by logical block address and may provide locks on a logical block address or a range of logical block addresses allowing different logical blocks or different ranges of logical blocks to be retrieved concurrently.

Logical to physical mapping 212 may associate logical blocks with physical blocks of a storage device. In some embodiments, a chunk sequence number may be associated with a logical block to indicate a physical chunk having the valid physical block corresponding to the logical block.

Figure 3:
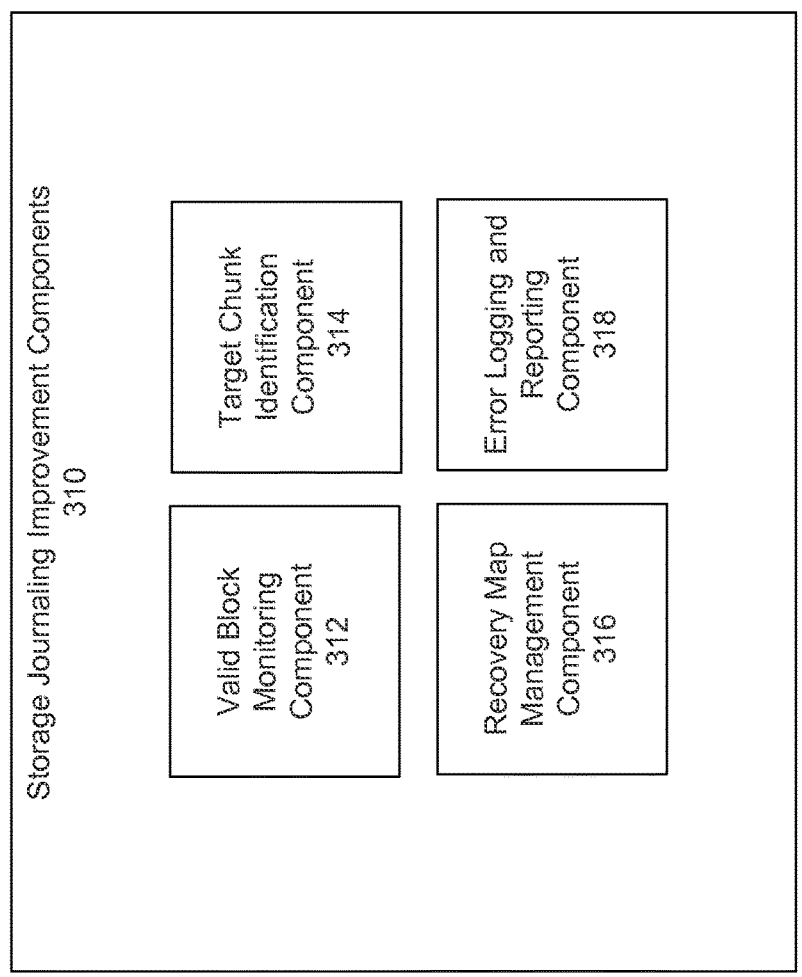
FIG. 3 is a block diagram depicting a component for improving storage journaling, in accordance with an embodiment of the present disclosure.

FIG. 3 depicts a component for improving storage journaling, in accordance with an embodiment of the present disclosure. Components may be hardware (e.g., dedicated circuitry), firmware, software, or a combination of the foregoing.

The description below describes network elements, computers, and/or components of a system and method for backup and restoration that may include one or more components. As used herein, the term "component" may be understood to refer to computing software, firmware, hardware, and/or various combinations thereof (e.g., (micro) processor, logic gates, switches, an application specific integrated circuit (ASIC), a programmable logic controller (e.g., FPGA), and an embedded microcontroller, electronic storage containing executable instructions, etc.). Components, however, are not to be interpreted as software which is not implemented on hardware, firmware, or recorded on a processor readable recordable storage medium (i.e., components are not software per se). It is noted that the components are exemplary. The components may be combined, integrated, separated, and/or duplicated to support various applications. Also, a function described herein as being performed at a particular component may be performed at one or more other components and/or by one or more other devices instead of or in addition to the function performed at the particular component. Further, the components may be implemented across multiple devices and/or other components local or remote to one another. Additionally, the components may be moved from one device and added to another device, and/or may be included in both devices. In some embodiments, one or more components may be implemented as part of SSD Controller, a host system, and/or SSD optimization software. As illustrated in FIG. 3, storage journaling improvement components 310 may contain valid block monitoring component 312, target chunk identification component 314, recovery map management component 316, and error logging and reporting component 318.

Valid block monitoring component 312 may track a number, percentage, or other indicator of valid blocks in a chunk (i.e., blocks which have not been overwritten).

Blocks in chunks which have not been overwritten before the journal wraps around (i.e., reaches a sequential end of flash storage and continues from a beginning of flash storage) may contain valid data which may need to be rewritten or lost. Valid block monitoring component 312 may track valid blocks and store the information in metadata associated with a chunk. Metadata may be associated with a Logical Block Address (LBA) map and may indicate a measure of the validity or invalidity of the data (e.g., a number of valid blocks, a number of invalid or overwritten blocks, a percentage of valid blocks, a percentage of invalid blocks, etc.). The metadata containing validity counts may be stored as part of a Logical Block Address map mapping Logical Block Addresses to Physical Block Addresses or it may be stored in a separate data structure. Counts or other indicators of validity may be grouped by chunk or by another grouping (e.g., a sector on a disk drive, a track on a disk drive, etc.). Valid block monitoring component 312 may monitor writes to portions of storage and may update a count when an overwrite occurs (e.g., reduce a number of valid blocks in a chunk when blocks in that particular chunk are overwritten).

Target chunk identification component 314 may use metadata about data validity to identify a portion of storage for a write. The portion of storage may be identified may be selected to reduce a number of valid portions of that storage that require rewriting. This may reduce write amplification issues, I/O traffic, CPU or controller utilization, and wear on a storage device. For example, Target chunk identification component 314 may skip over chunks containing a large amount of valid data and overwrite a chunk that has already received overwrites or data invalidation instead. In some embodiments, Target chunk identification component 314 may use metadata, such as a count of valid blocks in a chunk, and may compare the metadata against a specified threshold. For example, if a number of valid blocks in an identified chunk is below a specified threshold, Target chunk identification component 314 may select the storage of the identified chunk as a target location for a chunk of a write request. One or more valid blocks of the identified chunk may be read and repacked into a new chunk prior to the storage being overwritten by the write request. The repacked data may be written as part of a new chunk to a second location in storage. If however, Target chunk identification component 314 determines that a number of valid blocks in an identified chunk meets or exceeds a threshold, Target chunk identification component 314 may skip that chunk and evaluate another chunk for a potential target write location. In some embodiments, chunks or other units of storage may be evaluated sequentially. In one or more embodiments, metadata may be sorted allowing a portion of storage (e.g., a chunk, a track, a sector) with a lowest amount of valid storage to be identified. Target chunk identification component 314 may also evaluate other factors when determining whether to overwrite a portion of storage (e.g., an age of data, a last update time, a hotness or frequency of use of data, a sequential order of data, errors associated with a portion of storage, etc.).

In some embodiments, a threshold or other factors evaluated by Target chunk identification component 314 may be adjusted depending on one or more factors. Factors may include for example, a level of CPU utilization, a level of network utilization, and a user specified preference. In some embodiments, a threshold may require less than fifty percent of the blocks to be valid blocks to use the location of a chunk as a write location for the second chunk.

Skipping portions of data may break a traditional journal recovery format which may expect a sequential recovery. Recovery map management component 316 may generate and/or manage one or more data structures for recovering a journal despite skipped chunks. Some data formats may contain sequence numbers which may be used for recovery. For example, when a chunk is written out it may contain a sequence number which may be monotonically increasing. Recovery map management component 316 may track a sequence number associated with a valid portion of data (e.g., a physical block containing a most current copy of data). Traditionally, recovery may read chunks sequentially and use a chunk having a block of physical storage associated with a logical block address until a new chunk with a higher sequence number having a physical block associated with the same logical block address is identified. At that point the new physical block address may be associated with the logical block address. Recovery map management component 316 may associated a sequence number or other indicator of a portion of storage with a logical block address so that a recovery process may identify a current version of a portion of storage. For example, Recovery map management component 316 may associate a sequence number of a chunk with a logical block address. In some embodiments, when a recovery request is received Recovery map management component 316 may read one or more portions of storage sequentially. For example, Recovery map management component 316 may read all chunks and their blocks of storage. In some embodiments, Recovery map management component 316 may generate a data structure (e.g., a recovery sequence map) to associate a sequence number of a chunk having a physical block containing a current copy of data with a logical block address.

When reading a block of storage Recovery map management component 316 may determine whether a block exists in a recovery sequence map. If a block does not exist in a recovery sequence map, Recovery map management component 316 may add an entry with a sequence number of the current chunk containing the block. Recovery map management component 316 may also add the sequence number to a logical block address map. If a block does exist in a recovery sequence map, Recovery map management component 316 may compare a sequence associated with a currently read chunk with a sequence number stored in the recovery sequence map. If the sequence number stored in the recovery sequence map is higher than that of the currently read chunk, the block of the currently read chunk may be ignored. If the sequence number of the currently read chunk is higher than the sequence number stored in the recovery sequence map, the recovery sequence map and the logical block address map may be updated to include the new sequence number and physical block address. In some embodiments, recovery map management component 316 may monitor I/O and if a write occurs a logical block address may be associated with a sequence number of a current chunk and physical block address of the currently written physical block. If a later chunk (e.g., a chunk with a higher sequence number) indicates that a block has been deleted, the block may be deleted from the logical block address map and the recovery sequence map.

Once one or more reads have completed (e.g., all used blocks of flash storage being recovered), Recovery map management component 316 may facilitate recovery. Recovery map management component 316 may provide locking which may be on a per logical block basis, on a range of logical blocks, or on another unit of storage. Generation of a recovery sequence map may indicate a sequence number of a chunk associated with the physical block having the current data for a logical block, recovery may not require all writes to be read from a journal and applied sequentially. Chunks may be read in parallel and recovered with no concurrency limitation (i.e., wherein the entire recovery is sequential and serialized, proceeding in order according to the journal). In the disclosed systems and methods herein, all chunks can be read from the storage device in parallel and can be processed in parallel as soon as their reads have been completed. Recovery map management component 316 may partition a recovery sequence map and/or a logical block address map by logical block address and may provide locks on a logical block address or a range of logical block addresses allowing different logical blocks or different ranges of logical blocks to be retrieved concurrently. Access to the recovery sequence and logical block address maps will be performed in a serialized fashion, because it is the mechanism that controls overwrite detection. Partitioning these maps by logical block address can mitigate the impact of this serialization. Because access only needs to be serialized within a particular block address, a range of block addresses sharing a lock can allow recovery to be as parallel as possible without requiring a lock per block.

Error logging and reporting component 318 may trap errors and log errors associated with block monitoring or chunk identification. In some embodiments, error logging and reporting component 318 may provide notifications of errors.

Figure 4:
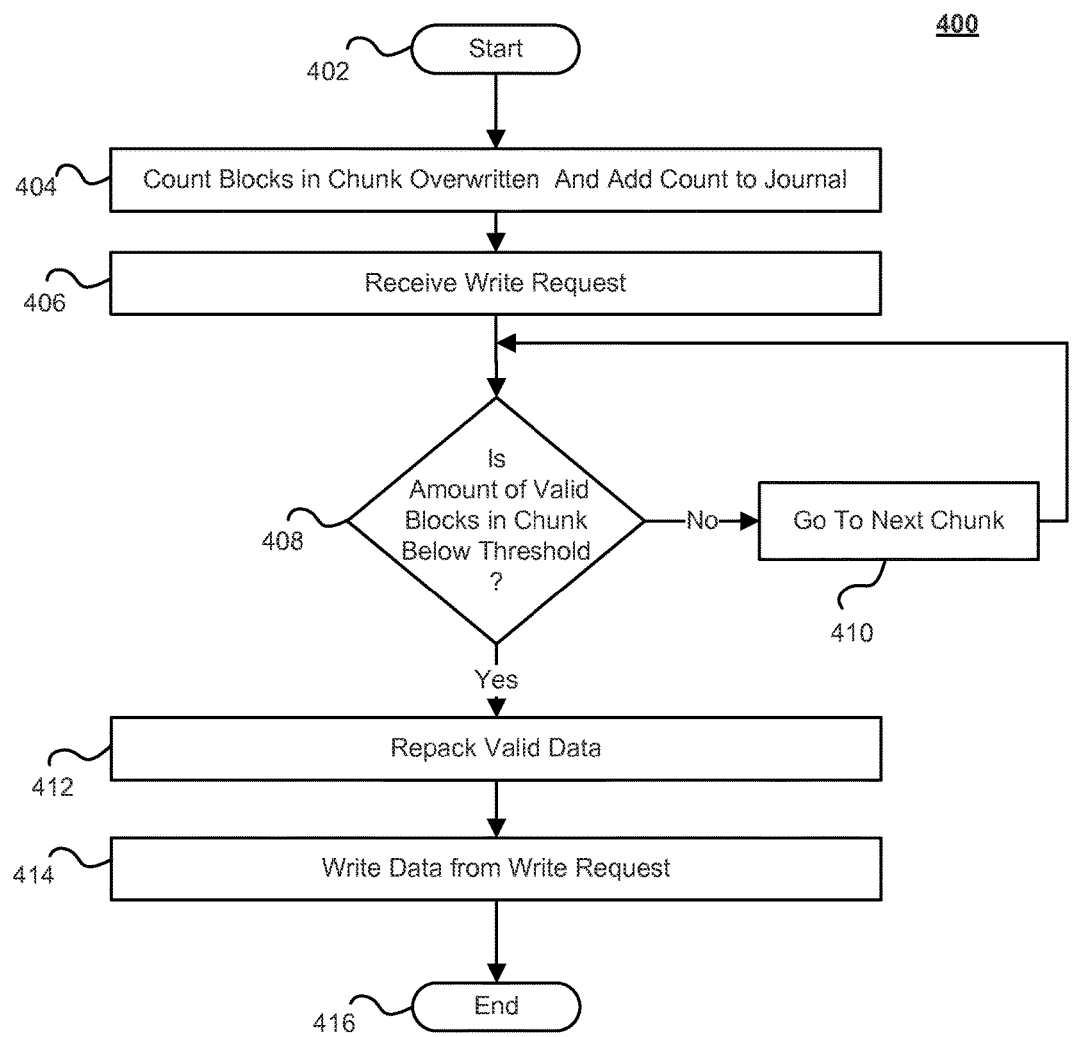
FIG. 4 depicts a flowchart illustrating a method for improving storage journaling, in accordance with an embodiment of the present disclosure.

FIG. 4 depicts a flowchart illustrating a method for improving storage journaling, in accordance with an embodiment of the present disclosure. The process 400, however, is exemplary only. The process 400 can be altered, e.g., by having stages added, changed, removed, or rearranged. At stage 402, the process may begin.

At stage 404, a number of valid blocks in a chunk may be identified. A number, percentage, or other indicator of valid blocks in a chunk (i.e., blocks which have not been overwritten) may be identified. Blocks in chunks which have not been overwritten before a journal wraps around (i.e., reaches a sequential end of flash storage and continues from a beginning of flash storage) may contain valid data which may need to be rewritten or otherwise may be lost. Valid blocks may be tracked and the number of those blocks stored in metadata associated with a chunk (e.g., in chunk valid block count 210 of FIG. 2). Metadata may be associated with a Logical Block Address (LBA) map and may indicate a measure of the validity or invalidity of the data (e.g., a number of valid blocks, a number of invalid or overwritten blocks, a percentage of valid blocks, a percentage of invalid blocks, etc.). The metadata containing validity counts may be stored as part of a Logical Block Address map mapping Logical Block Addresses to Physical Block Addresses (e.g., logical to physical mapping 212 of FIG. 2) or it may be stored in a separate data structure (e.g., chunk valid block count 210 of FIG. 2). Counts or other indicators of validity may be grouped by chunk or by another grouping (e.g., a sector on a disk drive, a track on a disk drive, etc.). In some embodiments writes to portions of storage may be monitored and a count may be updated when an overwrite occurs or a block is deleted (e.g., reduce a number of valid blocks in a chunk when blocks in that particular chunk are overwritten).

At stage 406 a write request may be received. At stage 408 it may be determined whether a current chunk of journal is an appropriate location for the write request. The determination may be based on one or more factors.

Metadata about data validity may be used to identify a portion of storage for a write. The portion of storage may be identified may be selected to reduce a number of valid portions of that storage that require rewriting. This may reduce write amplification issues, I/O traffic, CPU or controller utilization, and wear on a storage device. For example, chunks containing a large amount of valid data may be skipped and a chunk that has already received overwrites or data invalidation may be overwritten instead. During evaluation of a chunk a count of valid blocks in the chunk (e.g., from metadata generated in stage 304) may be compared against a specified threshold. For example, if a number of valid blocks in an identified chunk is below a specified threshold, the chunk may be selected as a target location for a chunk of a write request and the method may continue at stage 412. If however, it is determined that a number of valid blocks in an identified chunk meets or exceeds a threshold, that chunk may be skipped and the method may continue at stage 410.

In some embodiments, chunks or other units of storage may be evaluated sequentially. In one or more embodiments, metadata may be sorted allowing a portion of storage (e.g., a chunk, a track, a sector) with a lowest amount of valid storage to be identified. Other factors when determining whether to overwrite a portion of storage (e.g., an age of data, a last update time, a hotness or frequency of use of data, a sequential order of data, errors associated with a portion of storage, etc.).

In some embodiments, a threshold or other factors evaluated may be adjusted depending on one or more factors. Factors may include for example, a level of CPU utilization, a level of network utilization, and a user specified preference. In some embodiments, a threshold may require less than fifty percent of the blocks to be valid blocks to use the location of a chunk as a write location for the second chunk.

At stage 410, another chunk may be evaluated for a potential target write location. At stage 412, one or more valid blocks of the identified chunk may be read and repacked into a new chunk prior to the storage being overwritten by the write request. At stage 414, the repacked data may be written as part of a new chunk to a second location in storage. At stage 416, the method 400 may end.

Figure 5:
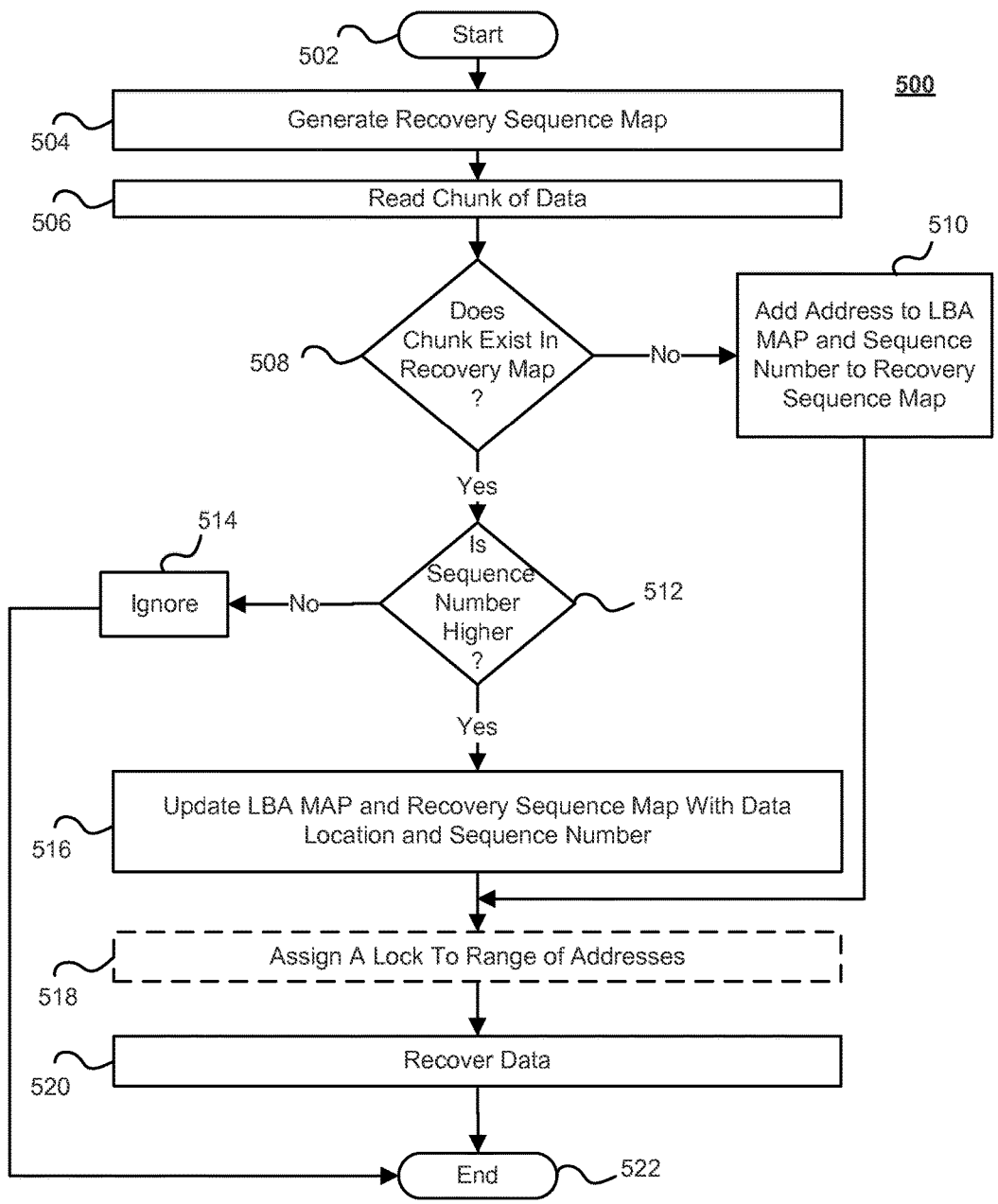
FIG. 5 depicts a flowchart illustrating a method for recovery using improved storage journaling, in accordance with an embodiment of the present disclosure.

FIG. 5 depicts a flowchart illustrating a method for recovery using improved storage journaling, in accordance with an embodiment of the present disclosure.

The process 500, however, is exemplary only. The process 500 can be altered, e.g., by having stages added, changed, removed, or rearranged. At stage 502, the process may begin.

At stage 504, one or more data structures for recovering a journal having skipped chunks may be generated (e.g., recovery mapping 214 of FIG. 2). Some data formats may contain sequence numbers which may be used for recovery. For example, when a chunk is written out it may contain a sequence number which is monotonically increasing. A sequence number associated with a valid portion of data (e.g., a physical block containing a most current copy of data) may be tracked. A sequence number or other indicator of a portion of storage may be associated with a logical block address so that a recovery process may identify a current version of a portion of storage. For example, a sequence number of a chunk may be associated with a logical block address. In some embodiments, a data structure (e.g., a recovery sequence map) may be generated to associate a sequence number of a chunk having a physical block with a current copy of data with a logical block address.

At stage 506, in some embodiments, when a recovery request is received one or more portions of storage may be read (e.g., sequentially). For example, all chunks and their blocks of storage may be read.

At stage 508, it may be determined whether a block exists in a recovery sequence map. If a block does not exist in a recovery sequence map, the method may continue at stage 510. If a block does exist in a recovery sequence map, the method may continue at stage 512.

At stage 510, the method may add an entry to a recovery sequence map with a sequence number of the current chunk containing the block. The physical block address of the current block may also be added to a logical block address map (e.g., logical to physical mapping 212 of FIG. 2).

At stage 512, the method may compare a sequence associated with a currently read chunk with a sequence number stored in the recovery sequence map. If the sequence number stored in the recovery sequence map is higher than that of the currently read chunk, the block of the currently read chunk may be ignored at stage 514. If the sequence number of the currently read chunk is higher than the sequence number stored in the recovery sequence map, the method may continue at stage 516.

At stage 516, the recovery sequence map and the logical block address map may be updated to include the new sequence number and physical block address. If a later chunk (e.g., a chunk with a higher sequence number) indicates that a block has been deleted, the block may be deleted from the logical block address map and the recovery sequence map.

At stage 518, once one or more reads have completed (e.g., all used blocks of flash storage being recovered), in some embodiments locking may be provided. Locking may be on a per logical block basis, on a range of logical blocks, or on another unit of storage. Generation of a recovery sequence map may indicate a sequence number of a chunk associated with the physical block having the current data for a logical block, recovery may not require all writes to be read from a journal and applied sequentially. A recovery sequence map and/or a logical block address map may be partitioned by logical block address and may provide locks on a logical block address or a range of logical block addresses allowing different logical blocks or different ranges of logical blocks to be retrieved concurrently At stage 520, chunks may be read (e.g., optionally in parallel if locking is used) and recovered. At stage 522, the method 500 may end.

Other embodiments are within the scope and spirit of the invention. For example, the functionality described above can be implemented using software, hardware, firmware, hardwiring, or combinations of any of these. One or more computer processors operating in accordance with instructions may implement the functions associated with for improving storage journaling in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method comprising:
reading a chunk of flash memory;
determining whether a physical block of a read chunk of flash memory is in a recovery sequence map;
if the physical block is not in the recovery sequence map:
adding an address of the physical block to a logical block address map, and
adding a sequence number associated with the read chunk of the flash memory to the recovery sequence map;
if the physical block is in the recovery sequence map:
comparing the sequence number associated with the read chunk of the flash memory to a sequence number associated with a chunk containing the physical block in the recovery sequence map;
if the sequence number associated with the read chunk of the flash memory is higher than the sequence number associated with the chunk containing the physical block in the recovery sequence map:
updating the logical block address map to include a physical block address of the physical block; and
updating the recovery sequence map to contain the sequence number associated with the read chunk of the flash memory.

2. The method of claim 1, further comprising:
recording to a journal a count of valid blocks in a first chunk of storage in flash memory;
receiving a write request to write data to the flash memory;
determining, using a controller, whether the count of valid blocks in the first chunk is below a specified threshold;

in an event when the count of valid blocks in the first chunk is below the specified threshold, writing the data of the write request to a location of the first chunk of storage in the flash memory;
receiving a recovery request; and
recovering one or more portions of the flash memory using the recovery sequence map.

3. The method of claim 2, wherein the count of valid blocks is maintained in metadata associated with one or more chunks of storage in the flash memory.

4. The method of claim 3, wherein the metadata is stored in the logical block address map.

5. The method of claim 2, wherein the count of valid blocks is updated when an overwrite of one or more blocks in the first chunk occurs.

6. The method of claim 2, wherein writing the data of the write request to a location of the first chunk of storage in the flash memory comprises repacking a portion of data of the first chunk of storage and writing the portion of data to a second storage location in the flash memory.

7. The method of claim 2, wherein when the count of valid blocks in the first chunk exceeds the specified threshold, determining, using the controller, whether a count of valid blocks in a third chunk of storage in the flash memory is less than the specified threshold.

8. The method of claim 2, wherein chunks of storage of flash memory are evaluated in a sequential order to determine whether a particular chunk of storage of flash memory contains a number of valid blocks below the specified threshold.

9. The method of claim 2, wherein metadata associated with one or more chunks of storage contains a count of valid blocks in each of the one or more chunks of storage and is sorted to identify a block of storage having a lowest count of valid blocks.

10. The method of claim 2, wherein the specified threshold is specified to reduce write amplification problems.

11. The method of claim 2, wherein the specified threshold is adjusted depending on at least one of a level of CPU utilization, a level of network utilization, and a user specified preference.

12. The method of claim 2, wherein the specified threshold is fifty percent of blocks in the first chunk of storage.

13. The method of claim 2, further comprising associating a logical block address with a flash memory block sequence number.

14. The method of claim 13, wherein associating the logical block address with the flash memory block sequence number comprises associating the flash memory block sequence number with the logical block address in a logical block address map.

15. The method of claim 14, further comprising:
partitioning the logical block address map by logical block address;
partitioning a recovery sequence map by logical block address; and
providing a lock for locking a range of block addresses, wherein the lock facilitates concurrent recovery of flash memory storage.

16. The method of claim 1, further comprising:
ignoring the read chunk when the sequence number associated with the read chunk of the flash memory is lower than the sequence number associated with the chunk containing the physical block in the recovery sequence map.

17. A non-transitory processor-readable storage medium storing a series of instruction that, when executed by a processor, perform a method comprising:
reading a chunk of flash memory;
determining whether a physical block of the read chunk of flash memory is in a recovery sequence map;
if the physical block is not in the recovery sequence map:
adding an address of the physical block to a logical block address map, and
adding a sequence number associated with the read chunk of the flash memory to the recovery sequence map;
if the physical block is in the recovery sequence map:
comparing the sequence number associated with the read chunk of the flash memory to a sequence number associated with a chunk containing the physical block in the recovery sequence map;
if the sequence number associated with the read chunk of the flash memory is higher than the sequence number associated with the chunk containing the physical block in the recovery sequence map:
updating the logical block address map to include a physical block address of the physical block; and
updating the recovery sequence map to contain the sequence number associated with the read chunk of the flash memory.

18. The non-transitory processor-readable storage medium of claim 17, wherein the method further comprises the steps of:
recording to a journal a count of valid blocks in a first chunk of storage in the flash memory;
receiving a write request to write data to the flash memory;
determining, using a controller, whether the count of valid blocks in the first chunk is less than a specified threshold;
in an event when the count of valid blocks in the first chunk is less than the specified threshold, writing the data of the write request to a location of the first chunk of storage in the flash memory;
receiving a recovery request; and
recovering one or more portions of the flash memory using the recovery sequence map.

19. A system comprising:
a flash memory; and
a device controller associated with the flash memory, wherein the device controller is configured to:
read a chunk of the flash memory;
determine whether a physical block of a read chunk of the flash memory is in a recovery sequence map;
if the physical block is not in the recovery sequence map:
add an address of the physical block to a logical block address map, and
add a sequence number associated with the read chunk of the flash memory to the recovery sequence map;
if the physical block is in the recovery sequence map:
compare the sequence number associated with the read chunk of the flash memory to a sequence number associated with a chunk containing the physical block in the recovery sequence map;
if the sequence number associated with the read chunk of the flash memory is higher than the sequence number associated with the chunk containing the physical block in the recovery sequence map:
update the logical block address map to include a physical block address of the physical block; and update the recovery sequence map to contain the sequence number associated with the read chunk of the flash memory.

20. The system of claim 19, wherein the device controller is further configured to record to a journal a count of valid blocks in a first chunk of storage in the flash memory;
receive a write request to write data to the flash memory;
determine whether the count of valid blocks in the first chunk is less than a specified threshold;
in an event when the count of valid blocks in the first chunk is less than the specified threshold, write the data of the write request to a location of the first chunk of storage in the flash memory;
receive a recovery request; and
recover one or more portions of the flash memory using the recovery sequence map.

21. The system of claim 20, wherein in the event the count of valid blocks in the first chunk exceeds the specified threshold a PCIe-based device controller is further configured to determine whether a count of valid blocks in a third chunk of storage in the flash memory is less than the specified threshold.

\* \* \* \* \*